United States Patent
Lokkinen

(10) Patent No.: US 10,259,187 B2
(45) Date of Patent: Apr. 16, 2019

(54) TUBE AND MANUFACTURING METHOD THEREOF

(71) Applicant: Picote Oy Ltd., Porvoo (FI)

(72) Inventor: Mika Lokkinen, Porvoo (FI)

(73) Assignee: Picote Oy Ltd., Porvoo (FI)

( * ) Notice: Subject to any disclaimer, the term of this patent is extended or adjusted under 35 U.S.C. 154(b) by 12 days.

(21) Appl. No.: 15/323,894

(22) PCT Filed: Jul. 6, 2015

(86) PCT No.: PCT/FI2015/050488
§ 371 (c)(1),
(2) Date: Jan. 4, 2017

(87) PCT Pub. No.: WO2016/009111
PCT Pub. Date: Jan. 21, 2016

(65) Prior Publication Data
US 2017/0246828 A1    Aug. 31, 2017

(30) Foreign Application Priority Data

Jul. 18, 2014 (FI) .................................. 20145679

(51) Int. Cl.
*F16L 55/165* (2006.01)
*B32B 1/08* (2006.01)
(Continued)

(52) U.S. Cl.
CPC ............ *B32B 1/08* (2013.01); *B29C 63/36* (2013.01); *B29C 65/4805* (2013.01); *B32B 3/02* (2013.01); *B32B 5/028* (2013.01); *B32B 5/10* (2013.01); *B32B 7/12* (2013.01); *B32B 7/14* (2013.01); *B32B 27/08* (2013.01); *B32B 27/12* (2013.01); *B32B 27/40* (2013.01); *B32B 37/02* (2013.01); *B32B 37/12* (2013.01); *B32B 37/185* (2013.01); *B32B 37/30* (2013.01); *F16L 11/02* (2013.01); *F16L 55/1656* (2013.01); *B29D 23/001* (2013.01); *B29K 2075/00* (2013.01); *B29K 2105/258* (2013.01); *B29L 2023/22* (2013.01); *B32B 2250/03* (2013.01); *B32B 2250/40* (2013.01); *B32B 2250/44* (2013.01);
(Continued)

(58) Field of Classification Search
CPC .............................. F16L 58/02; F16L 55/1656
USPC .................. 138/98, 124; 428/34.1, 35.7
See application file for complete search history.

(56) References Cited

U.S. PATENT DOCUMENTS 5,868,169 A * 2/1999 Catallo ............... F16L 58/02
138/124
2012/0308750 A1 12/2012 Rewill
(Continued)

FOREIGN PATENT DOCUMENTS

| AU | 2007231809 | 5/2009 |
| CA | 1339253 | 8/1997 |

(Continued)

*Primary Examiner* — Ellen S Wood
(74) *Attorney, Agent, or Firm* — Fasth Law Offices; Rolf Fasth

(57) ABSTRACT

The method is for manufacturing a tube in which a stretching film is fastened for a length of over one turn on both sides of a tube mesh that is only expandable on a circumference thereof. Each film is also fastened to itself. An expandable tube is formed which is expandable to a circumference allowed by the tube mesh.

4 Claims, 2 Drawing Sheets

(51) Int. Cl.
  *B32B 27/12* (2006.01)
  *F16L 11/02* (2006.01)
  *B32B 5/02* (2006.01)
  *B32B 7/12* (2006.01)
  *B32B 27/40* (2006.01)
  *B29C 63/36* (2006.01)
  *B29C 65/48* (2006.01)
  *B32B 5/10* (2006.01)
  *B32B 7/14* (2006.01)
  *B32B 27/08* (2006.01)
  *B32B 37/02* (2006.01)
  *B32B 37/12* (2006.01)
  *B32B 37/18* (2006.01)
  *B32B 37/30* (2006.01)
  *B32B 3/02* (2006.01)
  *B29D 23/00* (2006.01)
  *B29K 75/00* (2006.01)
  *B29K 105/00* (2006.01)
  *B29L 23/00* (2006.01)

(52) U.S. Cl.
  CPC ............. *B32B 2262/0261* (2013.01); *B32B 2262/0276* (2013.01); *B32B 2305/08* (2013.01); *B32B 2305/38* (2013.01); *B32B 2307/51* (2013.01); *B32B 2307/514* (2013.01); *B32B 2367/00* (2013.01); *B32B 2375/00* (2013.01); *B32B 2377/00* (2013.01); *B32B 2597/00* (2013.01)

(56) References Cited

U.S. PATENT DOCUMENTS

2013/0081732 A1\* 4/2013 Kiest, Jr. ............. F16L 55/1651
  138/98
2013/0261736 A1  10/2013 Kleiner

FOREIGN PATENT DOCUMENTS

| | | |
|---|---|---|
| DE | 9105040 | 7/1991 |
| FR | 2699979 | 7/1994 |
| JP | 0193339 | 4/1989 |
| WO | 2008030046 | 3/2008 |
| WO | 2011009630 | 1/2011 |

\* cited by examiner

TUBE AND MANUFACTURING METHOD THEREOF

PRIOR APPLICATIONS

This is a US national phase patent application that claims priority from PCT/FI2015/050488 filed 6 Jul. 2015, that claims priority from Finnish Patent Application No. 20145679, filed 18 Jul. 2014.

BACKGROUND OF THE INVENTION

The invention relates to a tube that can be expanded to a new size, and especially to a tube expandable by air pressure, as well as to a manufacturing method thereof.

In many fields, and especially in the field of pipe renovation, there is occasionally a need to line a pipe on the inside or to generate inside a pipe a pressure that is directed to the inner surface of the pipe. For example, when installing a renovation liner in a sewage pipe located inside structures or underground during sewage pipe renovation. An epoxy-impregnated renovation liner is airtight and can be pressurized, whereby the renovation liner presses against the inner surfaces of the pipe under air pressure and hardens into shape.

A problem with the arrangement described above is that the renovation lining must be closed during hardening, so it cannot have any openings. In addition, renovation liners are typically inelastic and, even when pressurised, they only straighten to a specific predetermined diameter.

So-called size modification liners also exist and they can be stretched to a diameter of 50 to 70 mm, for example. However, the end of the renovation liner needs to be closed or a tool needs to be used that expands to a diameter of 70 mm and pushes the renovation liner against the inner surface of the pipe. The renovation liner and possible tool needs to be pushed 50 mm along the pipe to a location where the pipe expands to a diameter of 70 mm. If the distance to be pushed is long or it has bends, this type of arrangement cannot be used, because it cannot be taken to the desired location. There are no means available in the market for making larger changes in size, because pushing the means to the installation location is, in practice, impossible.

BRIEF DESCRIPTION OF THE INVENTION

An object of the invention is thus to develop a tube and a tube manufacturing method so as to solve the above-mentioned problems. The object of the invention is achieved by a tube and tube manufacturing method that are characterised by what is stated in the independent claims. Preferred embodiments of the invention are disclosed in the dependent claims.

The invention is based on manufacturing the tube of a tube mesh that only stretches to a predetermined diameter and of a stretching film to be fastened on both sides thereof, whereby the tube mesh prevents the film from stretching too much and, consequently, breaking.

The tube of the invention provides the advantage that it stretches easily from one diameter to another, predetermined and considerably larger diameter. In addition, the tube withstands even high pressure without breaking, because the tube mesh limits its stretching.

BRIEF DESCRIPTION OF THE FIGURES

The invention will now be described in greater detail by means of preferred embodiments and with reference to the accompanying drawings, in which.

DETAILED DESCRIPTION OF THE INVENTION

Figure 1:
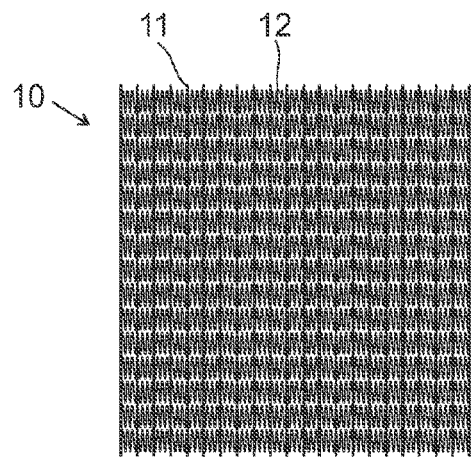
FIG. 1 shows the structure of a tube mesh in a non-stretched state.

FIG. 1 shows a non-stretched tube mesh made up of threads 11 in the longitudinal direction of the tube mesh 10 that run in a direction of the rotation axis of the tube, as well as threads 12 encircling the tube mesh that are connected to the longitudinal threads. The non-stretched threads 12 that encircle the tube mesh twist and cover mostly or almost completely gaps that remain between the longitudinal threads 11. The diameter of the tube mesh 10 may be easily increased by stretching the tube mesh, and its diameter may be easily decreased by flattening the tube mesh. In the longitudinal direction, however, the tube mesh does not stretch longer than the longitudinal threads. Preferably, the tube mesh 10 is made of non-stretchable thread, for instance polyester or nylon thread, in which case the tube mesh maintains approximately the diameter in which it is set. The elastic properties of the tube mesh are very poor and caused by the mesh structure rather than the threads, so, in practice, the tube mesh recovers its shape only slightly if the mesh is stretched or flattened into its extreme position.

Figure 2:
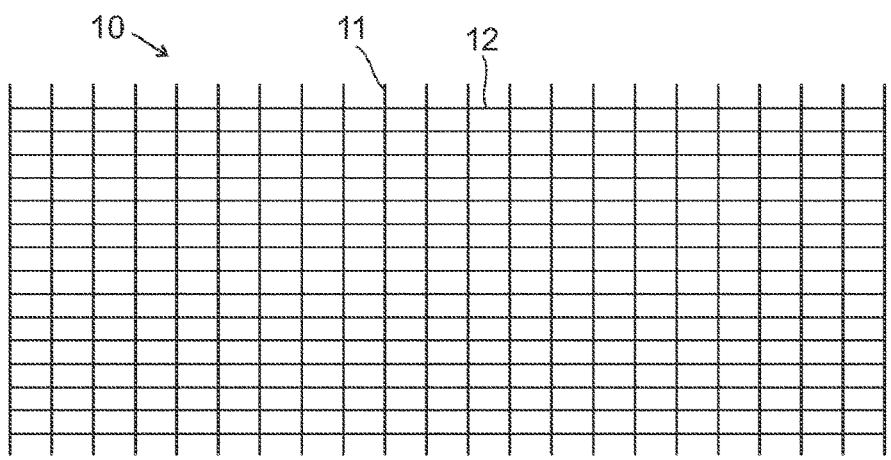
FIG. 2 shows the structure of the tube mesh in its extreme stretch.

FIG. 2 shows a tube mesh 10 stretched to its extreme shape and shows in comparison with FIG. 1 that the longitudinal threads 11 are further apart from each other because their number remained the same as the diameter of the tube mesh 10 increased. Another difference to FIG. 1 is that the threads 12 encircling the tube mesh have straightened and now form constantsize circles on the surface of the tube mesh. A third difference to FIG. 1 is that the longitudinal threads and the threads encircling the tube mesh now form a loose grid with clear gaps between the threads. The maximum size of the tube mesh is, thus, determined by the length of the threads encircling the tube mesh. The tube mesh easily expands to the diameter limited by the length of the threads encircling the tube mesh and stops there. If the stretching force is significantly increased, the threads encircling the tube mesh break at once or after having slightly stretched first. However, the relative difference between forces required for the expansion and breaking of the tube mesh is tenfold to multi-hundred-fold, so in practice the tube mesh cannot be broken by accident.

Figure 3:
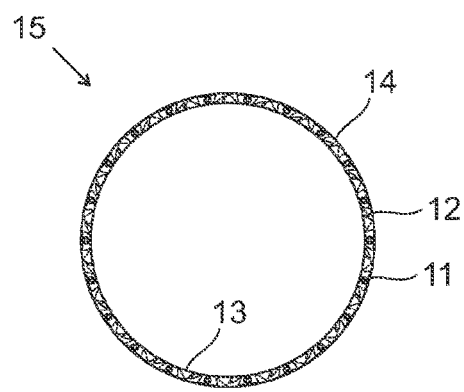
FIG. 3 shows the structure of the tube in a non-stretched state.
Figure 4:
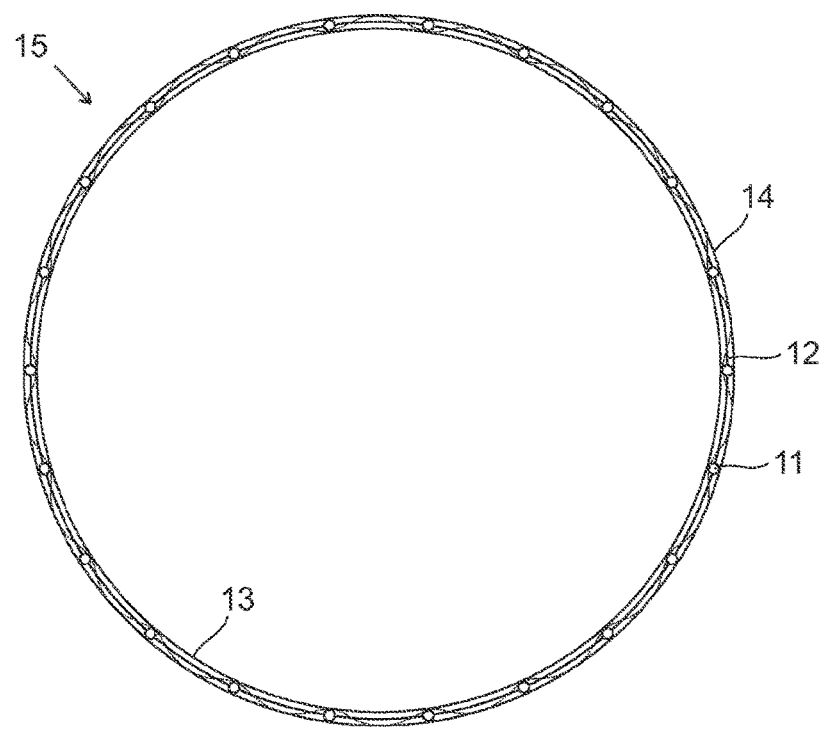
FIG. 4 shows the structure of the tube in its extreme stretch.

FIG. 3 shows a tube 15 made of tube mesh 10 and two films 13, 14 in a non-stretched state. In FIG. 4, the same tube 15 is shown stretched to the extreme. The tube 15 consists of a film 13 fastened to the inner surface of the tube mesh 10 and a film 14 fastened to the outer surface of the tube mesh. The films 13, 14 are fastened to the tube mesh 10 by glue or tape, for instance. In a preferred embodiment, the films have an adhesive surface on one side for fastening to the tube mesh when the film is pressed against the tube mesh. The films 13, 14 are made of a stretching material and may be made of an elastic material. In a preferred embodiment, the films are polyurethane films. In an embodiment, the thickness of the used polyurethane film is less than 1 mm, in another embodiment, the thickness of the polyurethane film is 0.05 to 0.5 mm. In a preferred embodiment, the thickness of the polyurethane film is 0.1 to 0.3 mm. A thin film stretches and shapes easier than a thick film, so it is often advantageous to use a film that is as thin as possible but still sufficiently thick to endure the stretch allowed by the tube mesh without breaking.

The tube 15 may be made by positioning the tube mesh 10 on a mould and pressing the tube mesh against the mould. The mould may be a rod or pipe with an angular, oval, or preferably round cross-section, whereby the tube mesh is easy to position evenly around the mould by slipping the tube mesh around the mould. The circumference of the mould determines the circumference of the tube to be made in the non-stretch state of the tube. The length of the threads 12 encircling the tube mesh, in turn, determines the circumference of the tube 15 to be made in the extreme stretch state of the tube. The interrelation of these circumferences can thus be made as desired and its maximum value is, in practice, limited by the stretch of the film without breaking. In an embodiment, a tube stretched to its full measure is 50 to 300% larger than an unstretched tube, preferably 100 to 250% larger. For instance, by using a 0.20 mm thick polyurethane film, it is possible to make a tube that expands 200%, i.e. a tube with a diameter of 50 mm, for example, that expands to a tube with a diameter of 150 mm.

The manufacture of the tube continues by positioning the film 13 against the tube mesh 10 positioned on the mould and by pressing the film to the tube mesh. Alternatively, the tube mesh 10 can be rolled to the film 13 by using the mould, for example. Preferably, a film with an adhesive or glue surface on one side thereof is used, so the film may be wound around the tube mesh and cut into a length that enables the forward and tail ends of the film to overlap slightly, in which case the film also adheres to itself and forms a seam having a double film, whereby the tube remains tubular in shape even when stretched and does not open from the side. The overlapping section may be 5%, 10% or 1 to 20% of the circumference of the unstretched tube, for instance. In an embodiment, the overlapping section is about 100%, for instance 90 to 110% or 80 to 120%, which in practice provides a double wall strength, and the film adheres firmly to itself along the entire length of the tube with no risk of the seam opening upon stretching.

On its inner surface, the film 13 adheres to the tube mesh 10, but since the tube mesh consists of straight and bent threads that are circular and partly overlapping, and there is air between the threads, the adherence is not as strong as when the film adheres to itself over its entire overlapping surface area. When the film 13 is in place as a tube on the tube mesh 10, the tube is detached from the mould and turned inside out in such a manner that the film 13 is on the inside of the tube and the tube mesh adhered to the film on the outside. This tube is then set back on the mould.

The tube 15 is finished by setting the film 14 that is to be the outer surface against the tube mesh 10 set on the mould and by pressing the film to the tube mesh. Alternatively, the tube mesh 10 may be rolled to the film 14 by using the mould, for example. Preferably, a film having an adhesive or glue surface on one side is used, so the film may be wound around the tube mesh and cut into a length that enables the forward and tail ends of the film to overlap slightly, whereby the film also adheres to itself and forms a seam with a double film and the tube remains tubular in shape even when stretched and does not open from the side. The overlapping section may be 5%, 10% or 1 to 20% of the circumference of the unstretched tube, for instance. In an embodiment, the overlapping section is about 100%, for instance 90 to 110% or 80 to 120%, which in practice provides a double wall strength, and the film adheres firmly to itself along the entire length of the tube with no risk of the seam opening upon stretching.

On its inner surface, the film 14 adheres to the tube mesh 10, but since the tube mesh consists of straight and bent threads that are circular and partly overlapping, and there is air between the threads, the adherence is not as strong as when the film adheres to itself over its entire overlapping surface area. The tube mesh contains so much thread and so small air gaps between the threads that, while collapsed, it prevents completely, almost completely, or at least in part the glue or adhesive surface of the film 13 on the inner surface and the glue or adhesive surface of the film 14 on the outer surface from adhering to one another.

The tube 15 is now ready and may be pressurized by closing one of its ends by binding it with a string, for instance, or by using glue or adhesive tape. The end remaining open may be glued or taped to the inner or outer surface of the open end of a pipe, such as renovation liner, whereby the tube 15 serves as an expanding stopper and expands as necessary with the pipe being pressurized either inside, outside, partially inside, and partially outside thereof. When overpressure over the ambient air pressure is applied to the pipe or renovation liner to be pressurized by supplying pressurized air to it, for example, the tube 15 expands. When the air pressure in the pipe to be pressurized is sufficiently high, the tube 15 expands to its full measure, i.e. the threads 12 encircling the tube mesh straighten. Already while manufacturing the tube mesh, the intention is to make the longitudinal threads straight, whereby the tube mesh 10 prevents the tube 15 from stretching in the longitudinal direction. In practice, slight twisting may remain in the longitudinal threads, in which case the tube may also stretch slightly in the longitudinal direction, but it is at least substantially non-stretching, i.e. the stretch is for instance less than 5% or less than 3% of the non-stretched length, so the stretch is of no significance in practice. An extensive stretch in the longitudinal direction could limit the maximum stretch of the diameter in order to avoid breakage of the film. In such a case, air pressure presses the inner film 13 against the outer film 14, making the films adhere firmly to one another by their opposite glue or adhesive surfaces inside the grid formed by the threads 11, 12 of the tube mesh 10. This is shown by dashed lines in FIG. 4. It is preferable to use a glue or adhesive surface strong enough and/or an elastic film weak enough to enable a tube 15 that has been expanded to its full measure to maintain its expanded shape even if the air pressure is dropped after a determined period of time to a level corresponding to that of the ambient air pressure.

It is obvious to a person skilled in the art that as technology advances, the basic idea of the invention may be implemented in many different ways. The invention and its embodiments are thus not restricted to the above-mentioned examples but may vary within the scope of the claims.

While the present invention has been described in accordance with preferred compositions and embodiments, it is to be understood that certain substitutions and alterations may be made thereto without departing from the spirit and scope of the following claims.

I claim:
1. A tube consisting of:
   a first stretching polyurethane film forming an inner surface of the tube;
   a second stretching polyurethane film forming an outer surface of the tube;

a tube mesh disposed between the first stretching film and the second stretching film in such a manner that said first and second stretching films are fastened to the tube mesh;

the first and second stretching films being at least partly detached from each other and the tube mesh being made up of longitudinal threads of the tube mesh and threads encircling the tube mesh so that the tube mesh is expandable in a circumference of the tube mesh, the tube mesh being fastened to the first and second stretching films in such a manner that the tube mesh prevents a longitudinal stretch of the tube, but allows a circumference of the tube to stretch to a limit value, in which the threads encircling the tube mesh have straightened between the first and second stretching films and prevent the tube from stretching further.

2. The tube as claimed in claim 1, wherein said limit value of the circumference is 50% to 300% greater than a circumference of a non-stretched tube.

3. The tube as claimed in claim 1, wherein said longitudinal threads are polyester or nylon threads.

4. The tube as claimed in claim 1 wherein said first and second stretching films have a glue surface on one side thereof.

* * * * *